United States Patent
Okamoto

(10) Patent No.: US 7,742,093 B2
(45) Date of Patent: Jun. 22, 2010

(54) DIGITAL CAMERA

(75) Inventor: Teppei Okamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 623 days.

(21) Appl. No.: 11/625,595

(22) Filed: Jan. 22, 2007

(65) Prior Publication Data

US 2007/0171293 A1 Jul. 26, 2007

(30) Foreign Application Priority Data

Jan. 23, 2006 (JP) .............................. 2006-014039

(51) Int. Cl.
*H04N 5/222* (2006.01)
(52) U.S. Cl. ................................ 348/333.02
(58) Field of Classification Search ............ 348/333.02, 348/333.01, 333.06, 333.11
See application file for complete search history.

(56) References Cited

U.S. PATENT DOCUMENTS

| | | | |
|---|---|---|---|
| 6,262,769 B1 * | 7/2001 | Anderson et al. ........ | 348/333.1 |
| 7,054,552 B2 * | 5/2006 | Konttinen ................... | 396/435 |
| 2006/0044444 A1 | 3/2006 | Okamoto et al. | |
| 2006/0176378 A1 | 8/2006 | Okamoto | |
| 2006/0177211 A1 | 8/2006 | Okamoto | |

FOREIGN PATENT DOCUMENTS

JP         2002-232753        8/2002

OTHER PUBLICATIONS

English language Abstract JP 2002-232753.

* cited by examiner

*Primary Examiner*—David L Ometz
*Assistant Examiner*—Dillon Durnford-Geszvain
(74) *Attorney, Agent, or Firm*—Greenblum & Bernstein P.L.C.

(57) ABSTRACT

A digital camera comprising an imaging device, a memory, a monitor, and a monitor controller is provided. The digital camera is used for photographing an optical image of an object as an image of a first rectangle. An aspect ratio of the first rectangle is a first aspect ratio. The imaging device generates an image signal. The monitor is a second rectangle. An aspect ratio of the second rectangle is a second aspect ratio. The second aspect ratio is decided to be lower than the first aspect ratio if the first aspect ratio is higher than one. The second aspect ratio is decided to be higher than the first aspect ratio if the first aspect ratio is lower than one. The monitor controller makes a displayed-image be displayed on the monitor according to a first or a second replay mode.

19 Claims, 10 Drawing Sheets

DIGITAL CAMERA

BACKGROUND OF THE INVENTION

1. Field of the Invention

The present invention relates to a digital camera that can display a captured image while being rotated according to a position of the digital camera on photographing.

2. Description of the Related Art

In the prior art, the imaging device used for a digital camera is formed to a rectangle, having long and short sides. The imaging device is mounted in the digital camera so that the long sides can be parallel to the horizon when the digital camera is in the regular position. In addition, the digital camera has a rectangular monitor, whose aspect ratio is the same as that of the imaging device. The monitor is usually mounted in the digital camera so that the long sides of the monitor can be parallel to the horizon when the digital camera is in the regular position.

Accordingly, a wide-width-photograph, whose width is greater than the height, is taken when the digital camera is in the regular position. On the other hand, a tall-height-photograph, whose height is greater than the width, is taken when the digital camera is in a vertical position, where the digital camera is rotated around the optical axis by 90 degrees. When the tall-height-photograph is replayed on the monitor, a user should rotate the digital camera by 90 degrees.

As for the above problem, Japanese Patent Publication No. 2002-232753 discloses a digital camera to display the tall-height-photograph automatically rotated by 90 degrees. Then, the tall-height-photograph is displayed on the monitor with a scale-down.

SUMMARY OF THE INVENTION

Therefore, an object of the present invention is to provide a digital camera that can display a tall-height-photograph on the monitor without a scale-down.

According to the present invention, a digital camera comprising an imaging device, a memory, a monitor, and a monitor controller is provided. The digital camera is used for photographing an optical image of an object as an image of a first rectangle. An aspect ratio of the first rectangle is a first aspect ratio. The first rectangle has first long sides and first short sides. The imaging device generates an image signal. The image signal corresponds to an optical image of the object. The memory stores the image signal generated by the imaging device. An image corresponding to the image signal is displayed on the monitor. The monitor is a second rectangle. An aspect ratio of the second rectangle is a second aspect ratio. The second aspect ratio is decided to be lower than the first aspect ratio if the first aspect ratio is higher than one. The second aspect ratio is decided to be higher than the first aspect ratio if the first aspect ratio is lower than one. The second rectangle has first sides and second sides. The monitor controller causes a displayed-image to be displayed on the monitor according to a first or a second replay mode. The displayed-image corresponds to the image signal stored in the memory. The displayed-image is displayed such that the first long side is parallel to the first side and an aspect ratio of the displayed-image is the same as the first aspect ratio in the first replay mode. The displayed-image is displayed as being rotated by 90 degrees in the second replay mode. The displayed-image is displayed such that the first long side is parallel to the second side and the aspect ratio of the displayed-image is the same as a reciprocal number of the first aspect ratio in the second replay mode.

Further, the displayed-image is displayed at maximum along the first side in the first replay mode. The displayed-image is displayed at maximum along the second side in the second replay mode.

Further, the second aspect ratio is substantially one.

Further, the digital camera comprises a switch. The switch causes the monitor controller to switch between the first replay mode and the second replay mode.

Further, the digital camera comprises a position sensor. The position sensor detects whether the digital camera is inclined with respect to a straight line perpendicular to a light receiving surface of the imaging device. The position detector generates inclination-signal when the position sensor detects that the digital camera is inclined. The memory stores the inclination-signal associated with the image signal. The inclination-signal is generated at the same time as when the image signal is generated. The monitor controller switches between the first replay mode and the second replay mode based on the inclination-signal.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
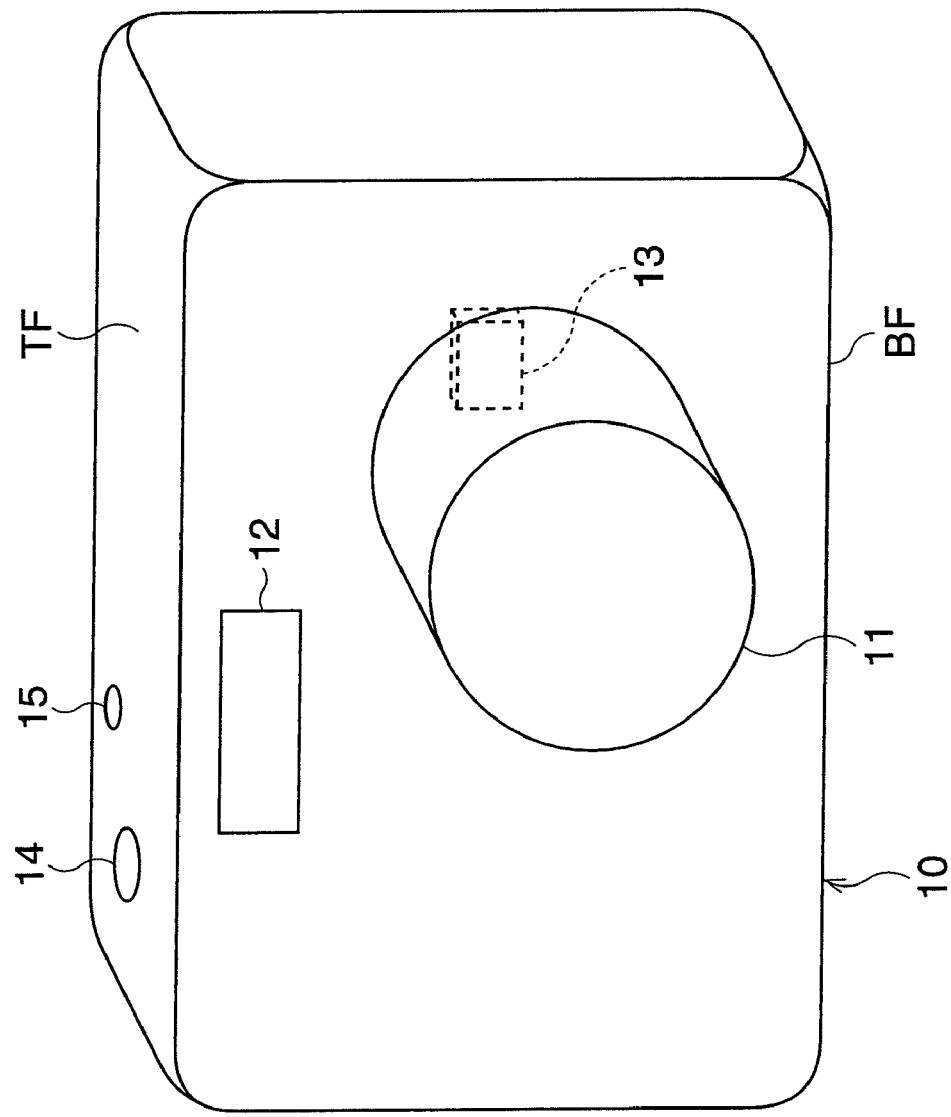
FIG. 1 illustrates a front side appearance of a digital camera of an embodiment of the present invention.

The present invention is described below with reference to the embodiment shown in the drawings.

Figure 2:
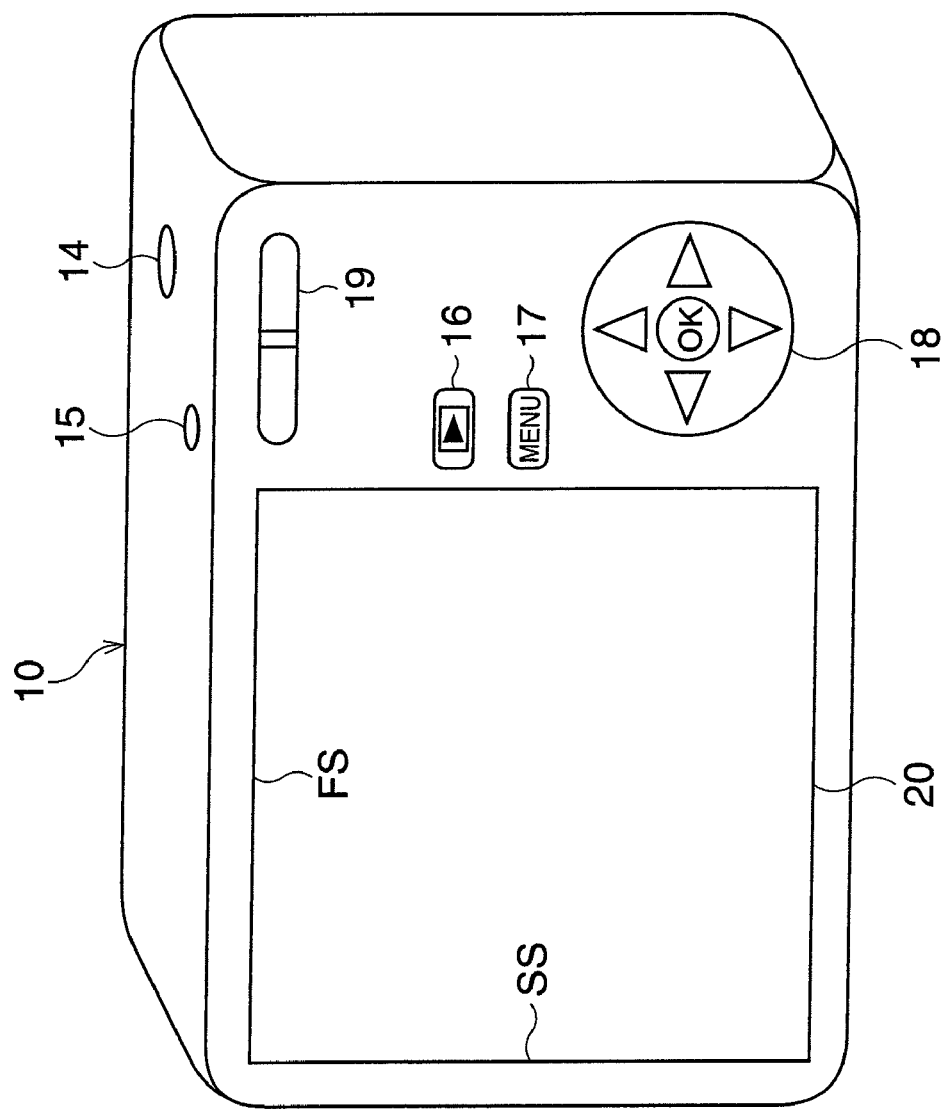
FIG. 2 illustrates a back side appearance of a digital camera of an embodiment of the present invention.

FIG. 1 illustrates a front side appearance of a digital camera of an embodiment of the present invention. FIG. 2 illustrates a back side appearance of a digital camera of an embodiment of the present invention.

A photographing lens 11 and a flash 12 are mounted on the front side of the digital camera 10. The photographing lens 11 enables an optical image of an object to be in focus on the light receiving surface of the imaging device 13 mounted in the digital camera 10. The flash is used to illuminate an object when the periphery of the object is dark.

A release button 14 and a power button 15 are mounted on the top face of the digital camera 10, hereinafter referred to as TF. The power of the digital camera 10 is switched on and off by pushing on the power button 15. An object is photographed by pushing on the release button 14.

A bottom face of the digital camera 10, hereinafter referred to as BF, and the TF are parallel. Both faces are formed so that both faces can be parallel to an optical axis of the photographing lens 11. Incidentally, a position where the TF and BF are parallel to the horizon is defined as a regular position of the digital camera 10. On the other hand, a position where the digital camera 10 is rotated around the optical axis of the photographing lens 11 by 90 degrees is defined as a vertical position.

A replay button 16, a menu button 17, a cross key 18, a zoom button 19, and a monitor 20 are mounted on the back face of the digital camera 10. The replay button 16, the menu button 17, the cross key 18, and the zoom button 19 are used for user's command input for some functions.

The monitor 20 is formed as a square. The monitor 20 is arranged so that two sides of the monitor 20 are parallel to the TF and BF. Incidentally, the sides parallel to the TF and BF is defined as a first side, hereinafter referred to as FS. The side perpendicular to the TF and BF is defined as a second side, hereinafter referred to as SS.

A photographing mode, a replay mode, and a setting mode are set up for the digital camera 10. A user may change and select the mode.

When the digital camera 10 is powered on, the digital camera 10 is in the photographing mode. The change between the photographing mode and the replay mode is carried out by pushing the replay button 16. The change between the photographing mode and the setting mode is carried out by pushing the menu button 17.

In the photographing mode, a thru-image is displayed on the monitor 20. Incidentally, the thru-image is the same as the optical image of an object captured by the imaging device 13 in real time. In the replay mode, the saved static image of an object by a photographing operation is displayed on the monitor 20. In the setting mode, a setting-image for changing some settings of the digital camera 10 (for example, an exposure compensation) is displayed on the monitor 20, and a user may change some settings.

The zoom button 19 is used to adjust a focal length of the photographing lens 11 in the photographing mode. The zoom button 19 is used to zoom in and to zoom out a replayed image in the replay mode. The cross key 18 is used to change some settings of the digital camera 10.

Next, the internal structure of the digital camera 10 is explained with reference to FIG. 3. The digital camera 10 comprises the photographing lens 11, the imaging device 13, a digital signal processor, hereinafter referred to as a DSP 21, a system controller 22, the monitor 20, a memory connector 23, a position sensor 24, and other components.

The photographing lens 11 is optically connected to the imaging device 13. An optical image of an object through the photographing lens 11 is incident to the light receiving surface of the imaging device 13. The photographing lens 11 and the imaging device 13 are arranged so that an optical axis of the photographing lens 11 can be perpendicular to the light receiving surface of the imaging device 13. The imaging device 13 is a CMOS imaging device. When the imaging device 13 captures an optical image of the object, the imaging device 13 generates an image signal corresponding to the optical image.

Figure 4:
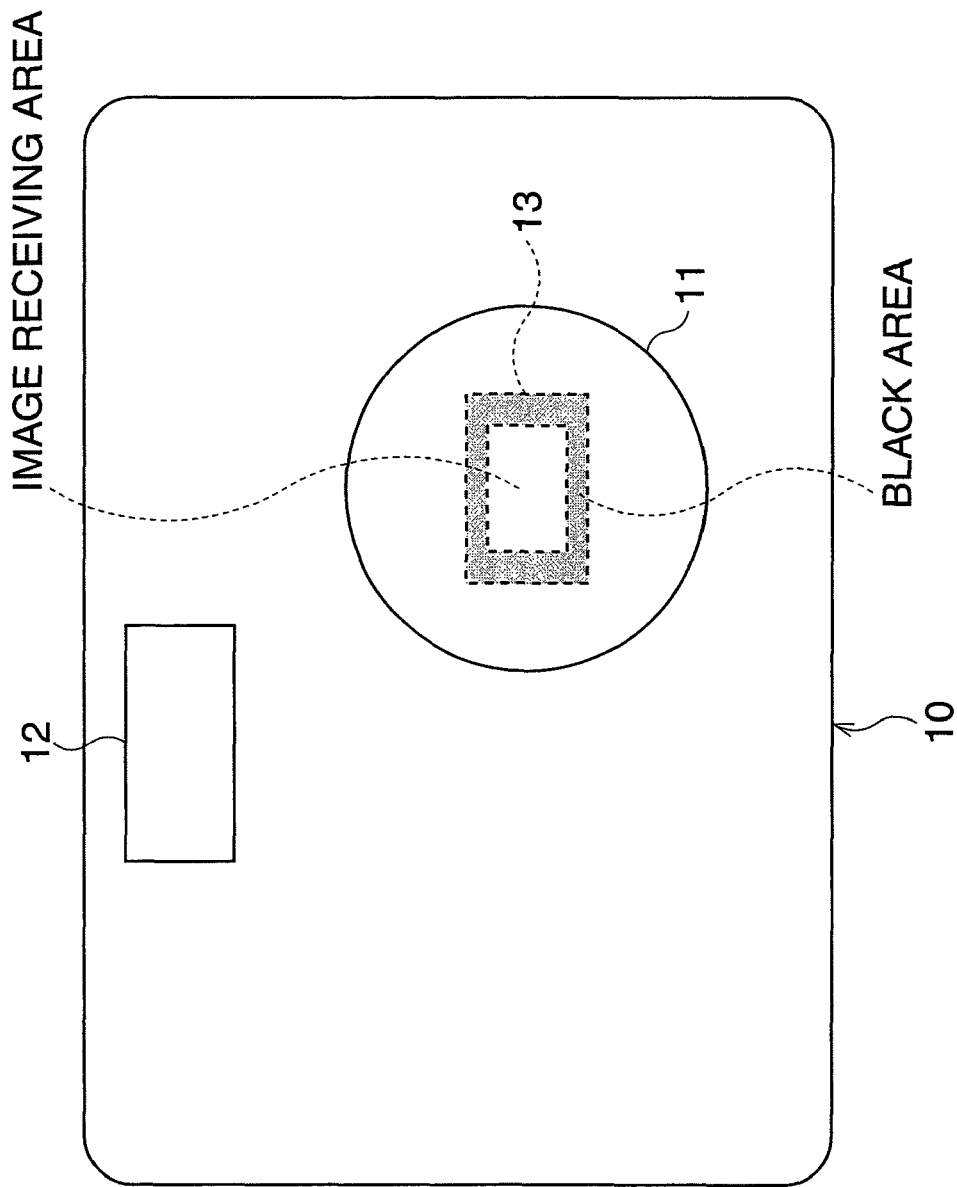
FIG. 4 illustrates an arrangement of the imaging device in the digital camera as viewed from the front side.

As shown in FIG. 4, an image receiving area is formed in the center of the light receiving surface of the imaging device 13. A black area is formed around the image receiving area at the light receiving surface. An optical image through the photographing lens 11 is received by the image receiving area, and then the image receiving area generates a signal corresponding to the optical image. The black area generates a signal corresponding to a standard black level of the received optical image. The signal corresponding to the optical image and the signal corresponding to the standard black level together form one frame of the image signal. The imaging device 13 outputs the image signal generated as described above.

Incidentally, the image receiving area is formed so that the aspect ratio of the image receiving area is 4:3. In addition, the imaging device 13 is arranged inside of the digital camera 10 so that the longer side of the image receiving area is parallel to the TF and the BF.

Figure 3:
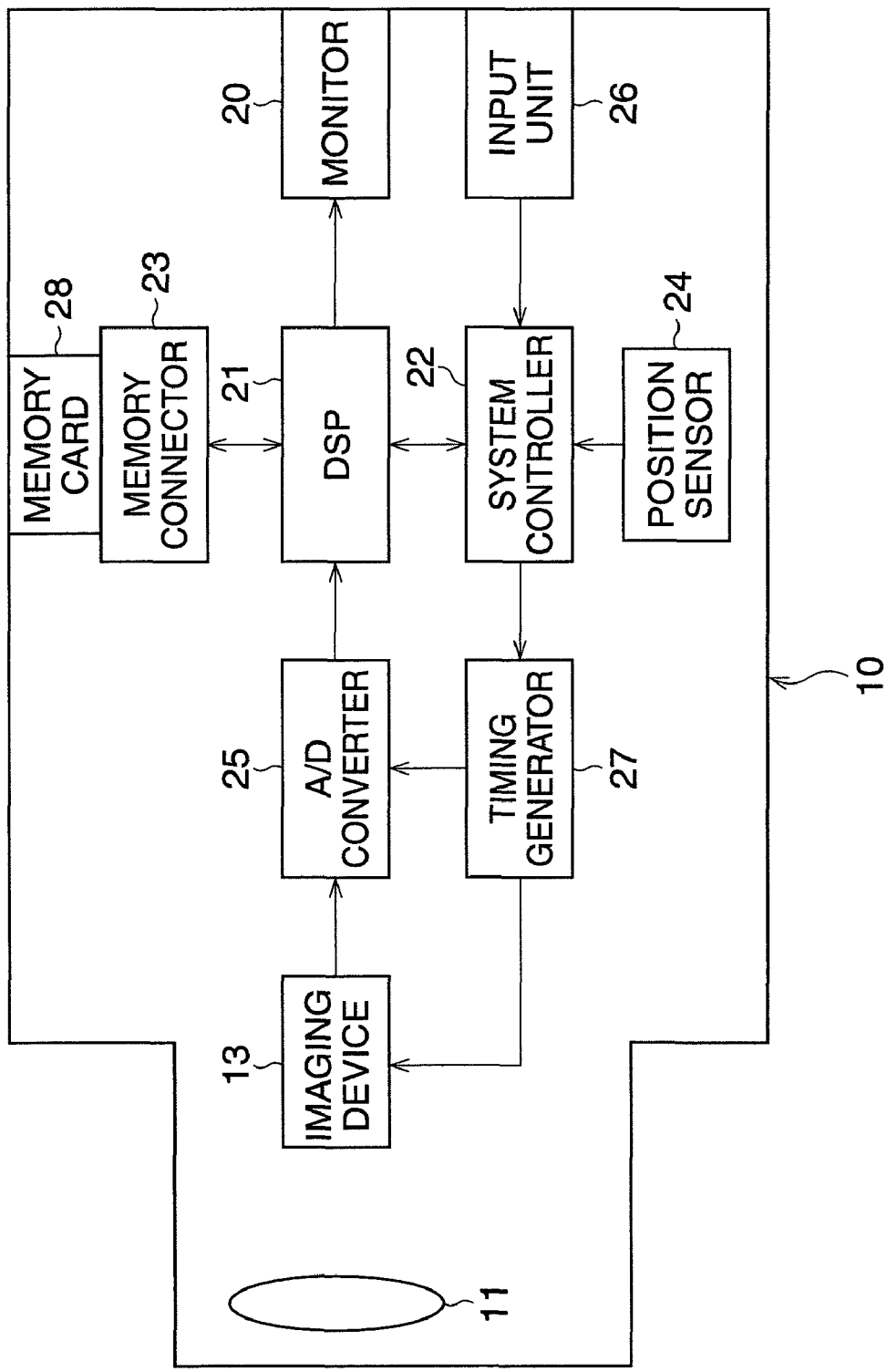
FIG. 3 is a block diagram showing the internal structure of the digital camera.

The imaging device 13 is connected to the DSP 21 through an A/D converter 25 (see FIG. 3). An image signal generated by the imaging device 13 is converted into a digital signal from an analog signal by the A/D converter 25. The image signal, having undergone the A/D conversion processing, is sent to the DSP 21.

The DSP 21 carries out predetermined signal processing for the image signal sent to the DSP 21. The image signal, having undergone the predetermined signal processing, is sent to the monitor 20. An image, corresponding to the image signal sent to the monitor 20, is displayed on the monitor 20.

When a release operation is carried out, one frame of the image signal, having undergone the predetermined signal processing, is stored on a memory card 28, which is connected to the DSP 21 via a memory connector 23. Incidentally, the memory card 28 may be connected to and disconnected from the memory connector 23 as necessary.

The DSP 21 is connected to the system controller 22. The system controller 22 commands the DSP 21 to carry out the predetermined signal processing. In addition, the system controller 22 controls the entire operation of the digital camera 10.

The system controller 22 is connected to the position sensor 24. The position sensor 24 detects whether the digital camera 10 is kept substantially in a vertical position. The position sensor 24 outputs a vertical-position signal to the system controller 22 when the digital camera 10 is kept substantially in a vertical position. The vertical-position signal is used by the system controller 22 when storing the image signal on the memory card 28, and when displaying an image corresponding to the image signal stored on the memory card 28, as described later.

The system controller 22 is connected to the input unit 26, which comprises the replay button 16, the menu button 17, the cross key 18, the zoom button 19, the release button 14, and the power button 15. When a user inputs a command to the input unit 26, a command signal corresponding to the command given is sent to the system controller 22. The system controller 22 controls the components of the digital camera 10 according to the command signal.

For example, when the replay button 16 is pushed on, the system controller 22 commands the DSP 21 so that the thru-image and a static image to display on the monitor 20 are switched. When the menu button 17 is pushed on, the system controller 22 commands the DSP 21 so that the thru-image and the setting-image to display on the monitor 20 are switched.

Also, when the zoom button 19 is pushed on in the photographing mode, the system controller 22 commands a lens driving unit (not depicted) so that the focal length of the photographing lens 11 can be adjusted.

In addition, when the release button 14 is fully pushed on in the photographing mode, the system controller 22 commands a timing generator 27 to drive the imaging device 13 so that the imaging device 13 captures an optical image and generates an image signal. Further, if the vertical-position signal is sent to the system controller 22 when the release button 14 is fully pushed, the vertical-position signal is added to the image signal as rotate-information and stored on the memory card 28.

Further, when the zoom button 19 is pushed on in the replay mode, the system controller 22 commands the DSP 21 so that the static image is displayed on the monitor 20 enlarged, and the magnification of the enlargement is adjusted.

Also, when the cross key 18 is pushed in the replay mode, the system controller 22 commands the DSP 21 so that the displayed static image is changed.

Figure 5:
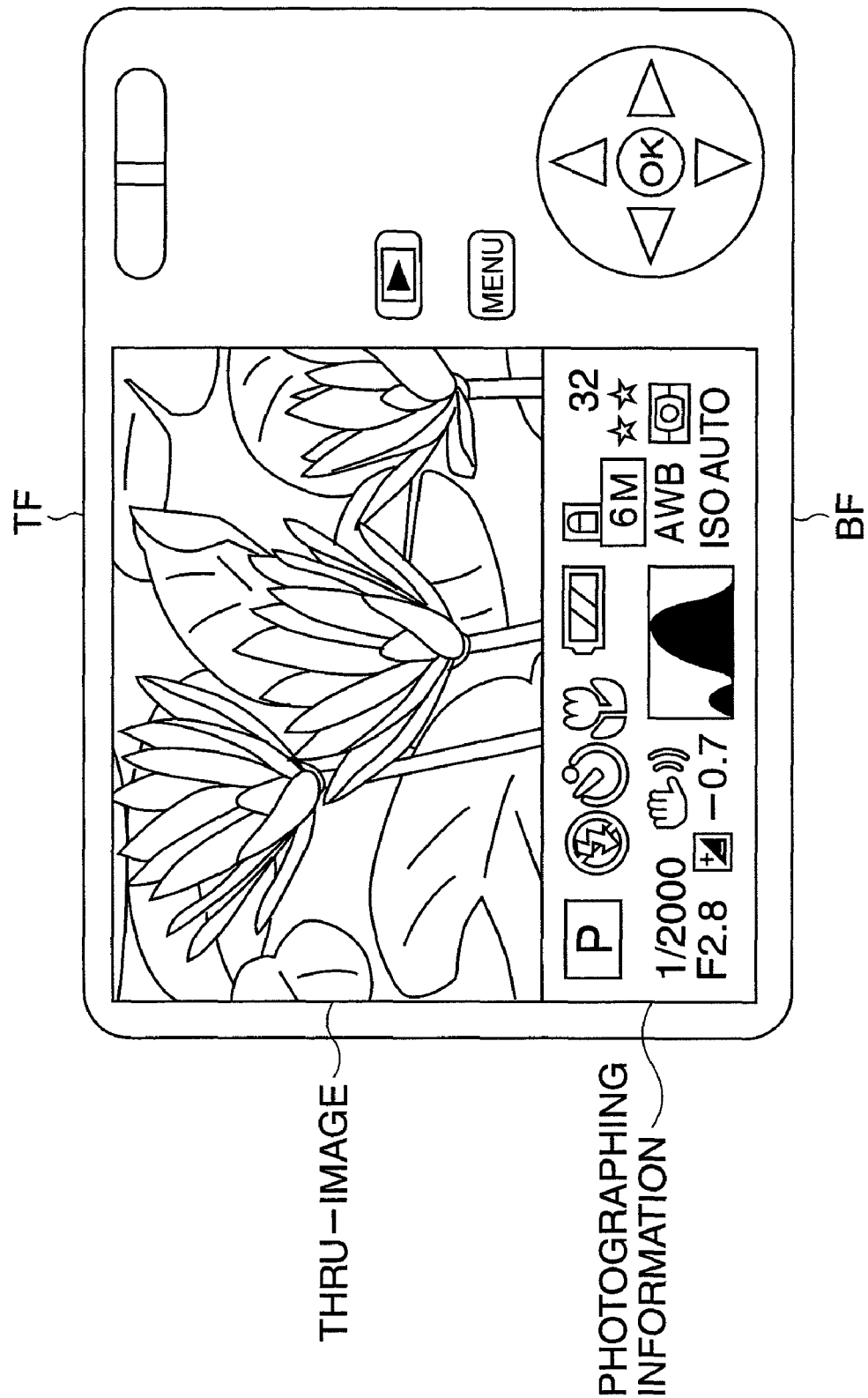
FIG. 5 illustrates an image displayed on the monitor in the photographing mode when the digital camera is kept in a regular position.
Figure 6:
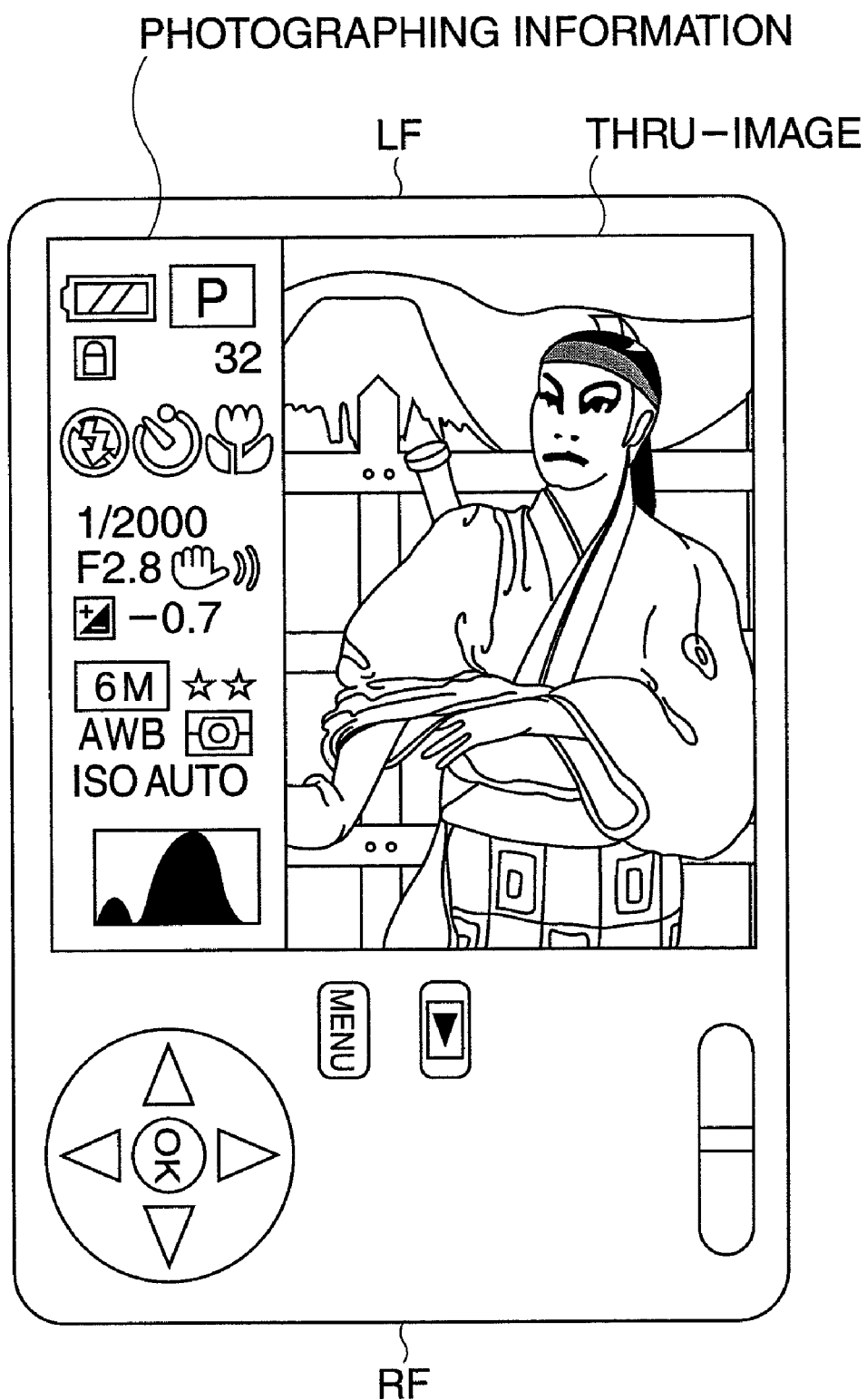
FIG. 6 illustrates an image displayed on the monitor in the photographing mode when the digital camera is kept in a vertical position.

Next, an image, displayed on the monitor 20 in the photographing mode, is described in detail below with reference to FIG. 5 and FIG. 6.

The thru-image is displayed on a portion of the monitor 20 designed for displaying the thru-image, hereinafter referred to as the image-displaying portion. The image-displaying portion is near the TF of the monitor 20 in the photographing mode. In addition, photographing information is displayed on a separate portion of the monitor 20, hereinafter referred to as the information-displaying portion. In addition, the information-displaying portion is near the BF of the monitor 20 in the photographing mode. Incidentally, the photographing information is information regarding some settings of the digital camera 10 and the current status of the photographing mode.

The information regarding some settings of the digital camera 10 may contain, for example, the focus, the shutter speed, the aperture value, the on/off status of the flash, the picture quality, the white balance, the photometry area, and the ISO sensitivity. The information regarding the current status may contain, for example, the current time, the remaining power of the battery, and a histogram of the thru-image.

The photographing information is displayed symbolically using predetermined icons, characters, and/or graphs. There are top and bottom sides for the photographing information. When the digital camera 10 is kept in any position except for a vertical position, the photographing information is displayed so that the top and bottom sides of the photographing information are toward the TF and BF, respectively (see FIG. 5).

On the other hand, when the digital camera 10 is kept in a vertical position, the photographing information is displayed so that the top and bottom sides of the photographing information are toward the left and right faces of the digital camera 10, hereinafter referred to as LF and RF, respectively (see FIG. 6).

Consequently, the top and bottom sides of the photographing information and the arrangement of the individual items comprising the photographing information are different when the digital camera 10 is held in the vertical position and when the digital camera 10 is held in any other position arrived at by rotating the digital camera 10 between 0-180 degrees from the vertical position. On the other hand, the locations of the image-displaying portion and the information-displaying portion are the same in the photographing mode.

It is determined that the digital camera 10 is in the regular position when the vertical-position signal is not added to the image signal. On the other hand, it is determined that the digital camera 10 is in a vertical position when the vertical-position signal is added to the image signal.

Figure 7:
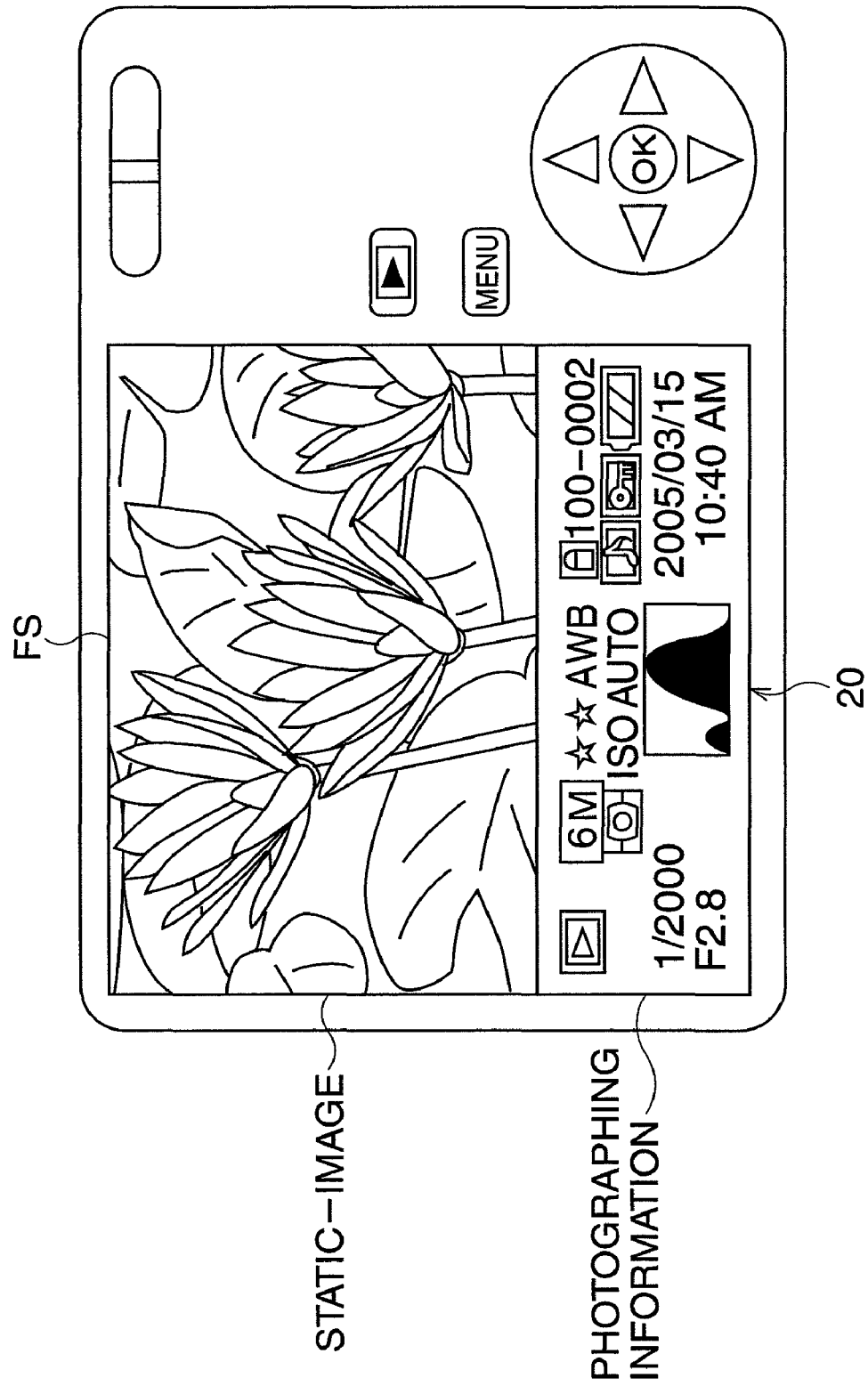
FIG. 7 illustrates an image displayed on the monitor in the first replay mode.
Figure 8:
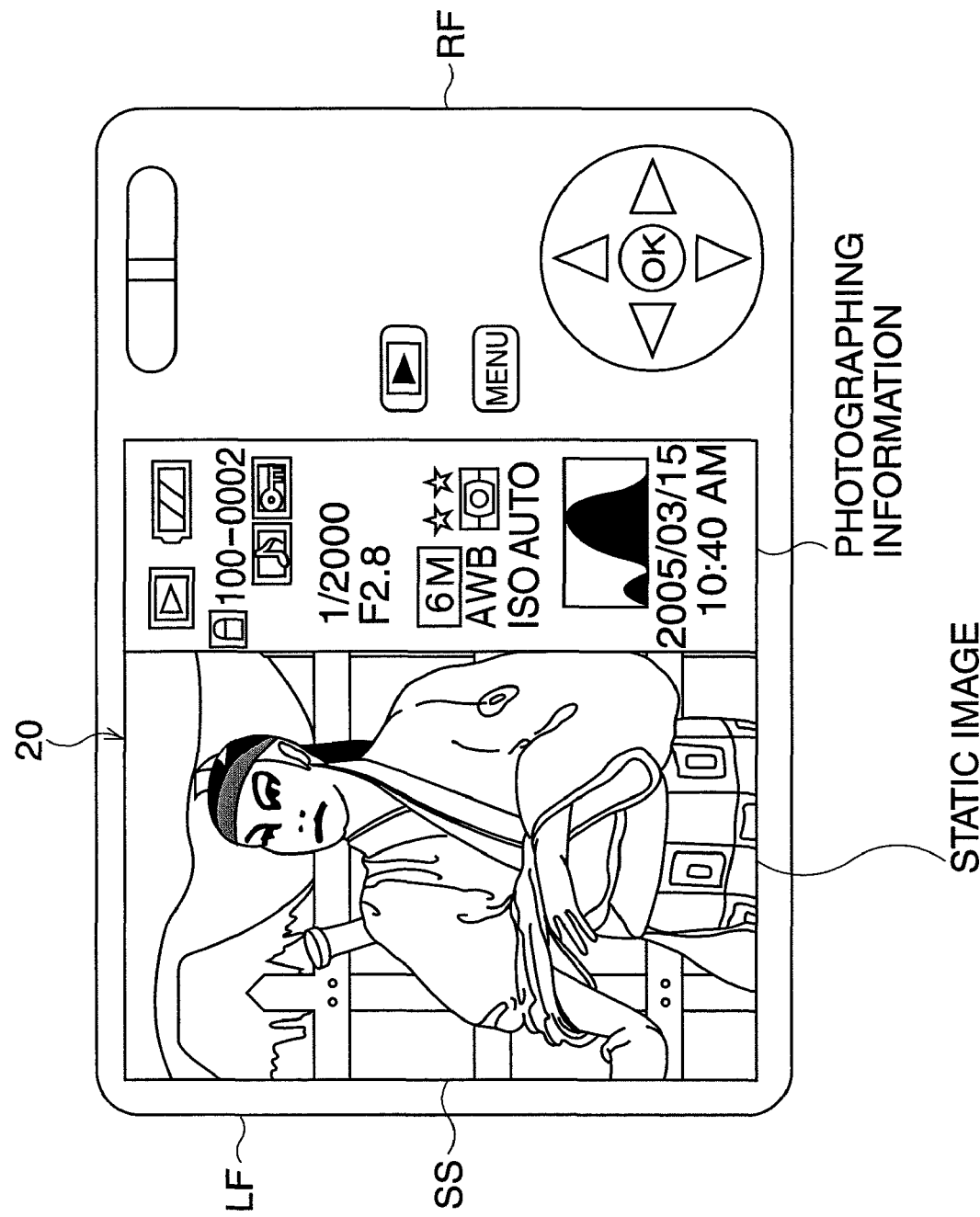
FIG. 8 illustrates an image displayed on the monitor in the second replay mode.

Next, an image, displayed on the monitor 20 in the replay mode, is described in detail below with reference to FIG. 7 and FIG. 8.

The replay mode comprises a first and a second replay mode. Either the first or the second replay mode is automatically selected according to an image signal corresponding to a displayed image in the replay mode. The system controller 22 selects the first replay mode when the vertical-position signal is not added to the image signal. On the other hand, the system controller 22 selects the second replay mode when the vertical-position signal is added to the image signal.

In the first replay mode, the static image is displayed on the monitor 20 so that the longer side of the static image is parallel to the FS. In addition, the magnification is adjusted so that the longer side of the static image occupies proportionally the same length of the FS as the captured optical image. Incidentally, the photographing information is displayed on a portion of the monitor 20 separate from the portion of the monitor 20 for displaying the static image on the monitor 20. Accordingly, the static image is displayed on the same portion of the monitor 20 in the first replay mode as the image-displaying portion in the photographing mode, and the photographing information is displayed on the same portion of the monitor in the first replay mode as the information-displaying portion in the photographing mode.

In the second replay mode, the static image is displayed on the monitor 20 so that the longer side of the static image is parallel to the SS. In addition, the magnification is adjusted so that the longer side of the static image occupies proportionally the same length of the SS as the captured optical image. In addition, the static image is displayed on a portion of the monitor 20 near the LF of the monitor 20. Incidentally, the photographing information is displayed on a portion of the monitor 20 separate from the portion of the monitor 20 for displaying the static image on the monitor 20. Accordingly, the portion of the monitor 20 displaying the photographic information is near the RF of the monitor 20.

Incidentally, the top and bottom sides of the photographing information are toward the TF and BF, respectively.

Figure 9:
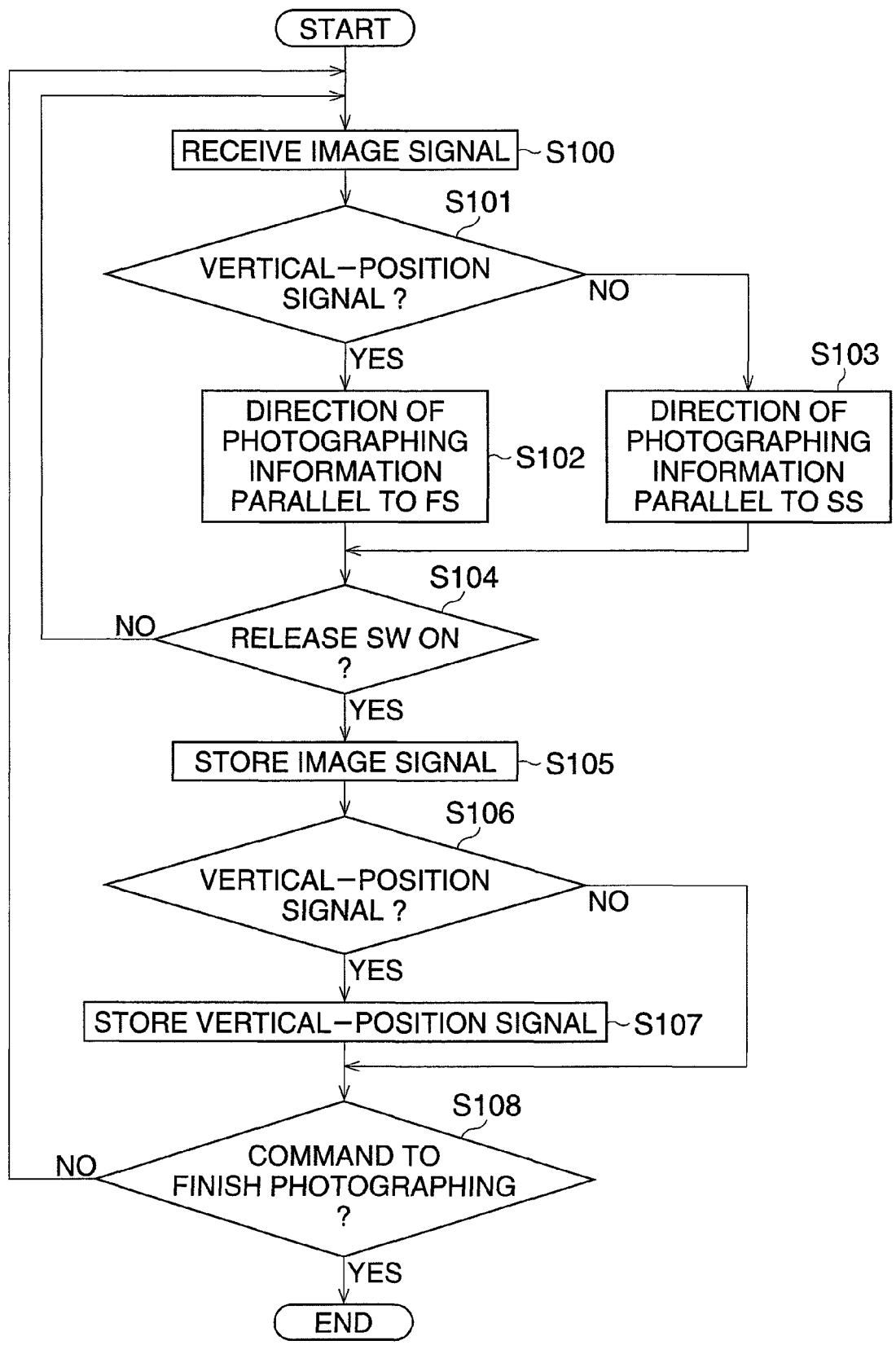
FIG. 9 is a flowchart to explaining some operations in the photographing mode carried out by the system controller and the DSP.
Figure 10:
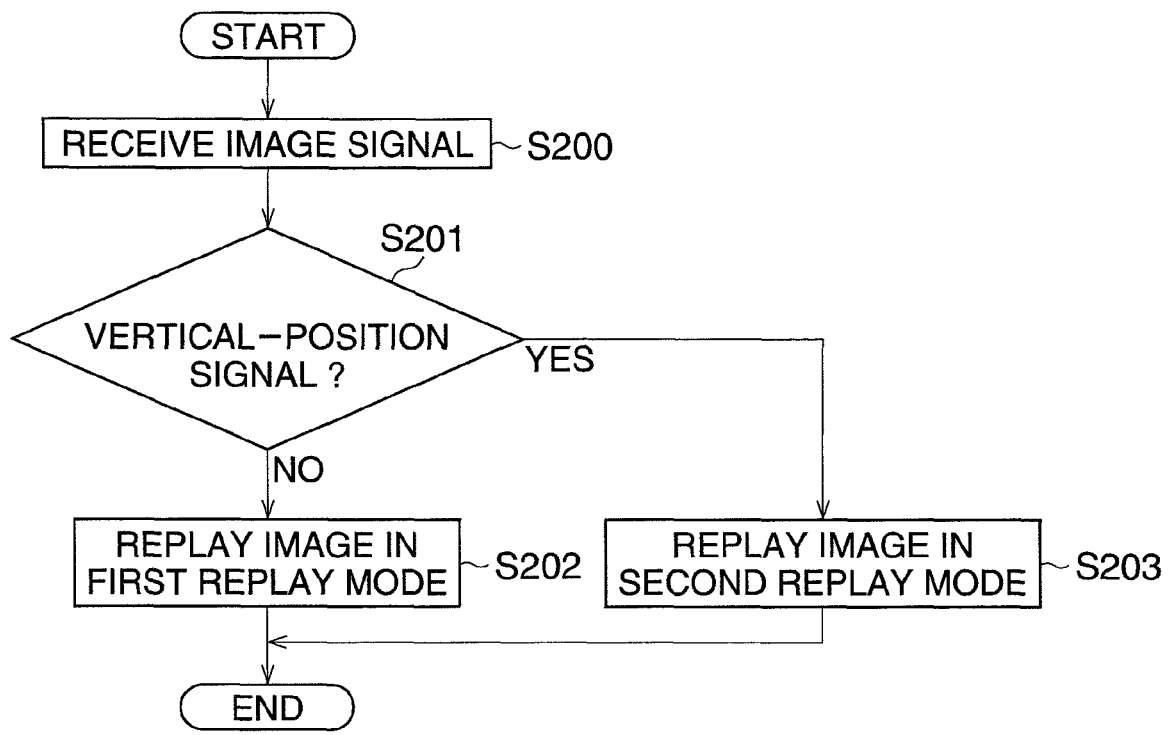
FIG. 10 is a flowchart to explaining some operations in the replay mode carried out by the system controller and the DSP.

Next, some operations in the photographing or replay mode carried out by the system controller 22 and the DSP 21 are explained below, using the flowcharts of FIG. 9 and FIG. 10.

The photographing mode starts when the power of the digital camera 10 is switched on, the replay button 16 is pushed on in the replay mode, or the menu button 17 is pushed on in the setting mode. At step S100, the DSP 21 receives an image signal generated by the imaging device 13. Then the predetermined signal processing is carried out for the received image signal.

At step S101, it is determined whether the position sensor 24 outputs the vertical-position signal. If the vertical-position signal is output, the process goes to step S102. At step S102, the thru-image and the photographing information are displayed on the monitor 20. Incidentally, the direction and the location of the displayed photographing information are adjusted so that the direction from the top side to the bottom side of the photographing information is parallel to the FS (see FIG. 6).

If the vertical-position signal is not output at step S101, the process goes to step S103. Also at step S103, the thru-image and the photographing information are displayed on the monitor 20. Incidentally, the direction and the location of the displayed photographing information are adjusted so that the direction from the top side to the bottom side of the photographing information is parallel to the SS (see FIG. 5).

After step S102 or step S103, the process goes to step S104. At step S104, it is determined whether the release switch 14 is switched on. If the release switch 14 is not switched on, the process returns to step S100, and step S100~step S104 are repeated until the release switch 14 is switched on.

If the release switch 14 is switched on, the process goes to step S105. At step S105, the image signal, having undergone the predetermined signal processing, is stored on the memory card 28.

After storing the image signal on the memory card 28, the process goes to step S106. At step S106, it is determined whether the position sensor 24 outputs the vertical-position signal. If the vertical-position signal is output, the process goes to step S107. At step S107, the vertical-position signal is added to the image signal, and the image signal is stored on the memory card 28.

If the vertical-position signal is not output at step S106, or after finishing the processing of step S107, the process goes to step S108. At step S108, it is determined whether there is a command to finish photographing, such as a command by pushing the replay button 16, or by pushing the menu button 17. If such a command is not input, the process returns to step S100, and step S100~step S108 are repeated until such a command is input. If such a command is input at step S108, the operations in the photographing mode are finished.

The replay mode starts when the replay button 16 is pushed on in the photographing mode, as described above. In the replay mode, a user may select an image to display on the monitor 20. At step S200, the DSP 21 receives an image signal, corresponding to the selected image to display, from the memory card 28. After receiving, the process goes to step S201. At step S201, it is determined whether a vertical-position signal was added to the received image signal.

If, at step S201, the vertical-position signal was not added to the received image signal, the process goes to step S202. At step S202, the first replay mode is selected, and then the static image of wide width is displayed on the monitor 20 while the digital camera 10 is kept in the regular position.

If, at step S201, the vertical-position signal was added to the received image signal, the process goes to step S203. At step S203, the second replay mode is selected, and then the static image of tall height is displayed on the monitor 20 while the digital camera 10 is kept in the regular position.

After displaying the static image of wide width or of tall height, the operations to display a static image are finished.

In the above embodiment, it is possible to display a rotated static image of tall height that is photographed in a vertical position of the digital camera 10 even if the magnification of the enlargement of the displayed static image is the same as that of the static image of wide width. The reason is described as follows. The first side of the monitor 20 is as long as the second side of the monitor 20. The static image of wide width is displayed so that the longer side of the static image is as long as the first side of the monitor 20 and the static image of tall height is displayed so that the longer side of the static image is as long as the second side of the monitor 20.

In addition, a user can easily check the photographing information in the photographing mode, especially in the vertical position of the digital camera 10. The reason is that the direction of the displayed photographing information changes according to whether the digital camera 10 is kept in a vertical position.

In addition, a user can easily observe a thru-image or a static image, and the photographing information, together. In the prior art, the photographing information is superimposed on a thru-image or a static image. However, in the above embodiment, the photographing information is displayed on a portion of the monitor 20 separate from the portion of the monitor 20 for displaying a thru-image or a static image of the monitor 20. Consequently, the thru-image or the static image and the photographing information are observed respectively easily, as described above.

The monitor 20 is formed as a square in the above embodiment. However, the monitor 20 may be formed as a rectangle as long as the aspect ratio of the monitor 20 is lower than the aspect ratio of the image receiving area of the imaging device 13, which is 4/3, for displaying the static image of tall height as tall as possible. Further, it is preferable that the aspect ratio of the monitor 20 be higher than a reciprocal number of the aspect ratio of the image receiving area in order to prevent the displayed static image of wide width from being too small. Further, it is more preferable that the aspect ratio of the monitor 20 be near one.

In the above embodiment, the width of the image receiving area of the imaging device 13 is greater than the height in the regular position of the digital camera 10, and the aspect ratio of the image receiving area is higher than one. However, the height of the image receiving area may be greater than the width, as long as the aspect ratio of the monitor 20 is higher than the aspect ratio of the image receiving area for displaying the static image of wide width as wide as possible. Further, it is preferable in this case that the aspect ratio of the monitor 20 be lower than the reciprocal number of the aspect ratio of the image receiving area in order to prevent the displayed static image of tall height from being too small.

A static image is displayed in the replay mode so that a longer side of the static image is as long as either the FS or the SS of the monitor 20 in the above embodiment. However, the length of the longer side may be different from either the FS or the SS. Of course, an entire static image may be displayed as large as possible within the portion of the monitor for the image both in the first and in the second replay mode, such as in the above embodiment. However, even if the entire static image cannot be displayed as large as possible either in the first or in the second replay mode, the entire static image, both in the first and in the second replay mode, can still be larger than in the prior art.

A position sensor 24 is used in the above embodiment. However, another device or another system, which informs the system controller 22 of whether the digital camera 10 is kept in a vertical position in the photographing or the replay mode, may alternatively be used. For example, a position change switch may be used. The position change switch may be used for the user's command input when the user changes the position of the digital camera 10 in the photographing mode. Alternatively, the position change switch may be used for a user to select the first or the second replay mode directly.

The position sensor 24 is used for determining whether the digital camera 10 is kept in a vertical position in the above embodiment. However, a tilt sensor that detects an angle of inclination to the ground may alternatively be used. Such a sensor may detect the angle of rotation of the digital camera 10 around an imaginary axis perpendicular to the light receiving surface relative to the regular position. In addition, a situation in which the angle of inclination from the regular position is over 45 degrees may be regarded as a vertical position if the tilt sensor is used. Accordingly, the direction of the photographing information may be rotated, or a vertical-position signal may be added to the image signal, when the angle of inclination is over 45 degrees.

The photographing information is displayed on a portion of the monitor 20 separate from the portion of the monitor 20 for displaying a static image on the monitor 20 in the above embodiment. However, the photographing information may, alternatively be superimposed on the static image. The rotated static image may then be displayed without lowering the magnification, even while the photographing information is superimposed. Of course, the photographing information should be displayed on a portion of the monitor 20 separate from the portion of the monitor 20 for displaying the static image on the monitor 20, for a user's easy viewing. Incidentally, in any embodiment, when the static image is zoomed in by adjusting the magnification, the photographing information may be superimposed on the static image. In addition, when the magnification is over a predetermined cited value, the photographing information may disappear.

The aspect ratio of a static image is the same as that of the image receiving area of the imaging device 13 in the above embodiment. However, the aspect ratio of the static image may be decided according to signal processing carrying out at the DSP 21. For example, a static image, whose aspect ratio is different from that of the image receiving area, may be generated by trimming, at the DSP 21, a image captured by the image receiving area. The aspect ratio of the monitor 20 should be between the aspect ratio of the trimmed static image and the reciprocal number of the aspect ratio of the trimmed static image if the aspect ratio of the static image is decided according to the signal processing.

A static image is displayed on the monitor 20 in the above embodiment. However, the static image may alternatively be displayed on another monitor of a display that is connected to the memory card 28 storing the image signal having the vertical-position signal. In addition, the static image may be displayed on another monitor of a display that is connected to the digital camera 10.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-014039 (filed on Jan. 23, 2006), which is expressly incorporated herein, by reference, in its entirety.

The invention claimed is:

1. A digital camera for photographing an object and obtaining an optical image of the object as an image having a shape of a first rectangle that has a first aspect ratio, said first rectangle having first long sides and first short sides, said digital camera comprising:
    an imaging device that generates an image signal corresponding to the optical image of the object;
    a memory that stores said image signal generated by said imaging device;
    a monitor on which an image corresponding to said image signal is displayed, said monitor including a second rectangle having a second aspect ratio, said second aspect ratio being lower than said first aspect ratio if said first aspect ratio is higher than one, said second aspect ratio being higher than said first aspect ratio if said first aspect ratio is lower than one, said second rectangle having first sides and second sides;
    a monitor controller that causes a displayed-image corresponding to said image signal stored in said memory to be selectively displayed on said monitor in a first or in a second replay mode, said displayed-image being displayed such that one of said first long sides is parallel to one of said first sides and such that an aspect ratio of said displayed-image is the same as said first aspect ratio in said first replay mode, said displayed-image being displayed rotated by 90 degrees such that one of said first long sides is parallel to one of said second sides and such that an aspect ratio of said displayed-image is the same as a reciprocal of said first aspect ratio in said second replay mode; and
    a position sensor that generates an inclination-signal when said position sensor detects that said digital camera is inclined with respect to a straight line perpendicular to a light receiving surface of said imaging device, and parallel to the horizon,
    said memory storing said inclination-signal, generated concurrently with said image signal in association with said image signal, and said monitor controller switching between said first replay mode and said second replay mode based on said inclination-signal;
    said digital camera including a photographing mode in which the positions of the image and photographic information on the monitor do not change in accordance with an orientation of the digital camera while the orientation of the photographic information on the monitor changes in accordance with the orientation of the digital camera,
    wherein, in the replay modes, the positions of the image and photographic information on the monitor change in accordance with the orientation of the digital camera in the photographing mode, while the orientation of the photographic information on the monitor does not change in accordance with the orientation of the digital camera in the photographing mode.

2. A digital camera according to claim 1, wherein said displayed-image is displayed at maximum along said first side in said first replay mode, and said displayed-image is displayed at maximum along said second side in said second replay mode.

3. A digital camera according to claim 1, further comprising a switch that causes said monitor controller to switch between said first replay mode and said second replay mode.

4. A digital camera according to claim 1, wherein said monitor controller displays photographing information on a portion of said monitor that is distinct from a portion of said monitor for displaying said displayed-image, and
    said monitor controller changes an orientation direction of said displayed photographing information based on said inclination-signal in a photographing mode where said image signal generated by said imaging device is stored in said memory when a photographing command is input.

5. A digital camera according to claim 1, wherein said monitor controller displays photographing information on a portion of said monitor that is distinct from a portion of said monitor for displaying an image corresponding to said image signal generated by said imaging device on said monitor in a photographing mode where said image signal generated by said imaging device is stored in said memory when a photographing command is input.

6. A digital camera according to claim 1, wherein
    said memory stores a photographing signal, corresponding to photographing information, associated with said image signal, said photographing signal and said image signal being stored in associating with each other and being concurrently generated, and
    said monitor controller displays said photographing information on a portion of said monitor that is distinct from a portion of said monitor for displaying said displayed-image in each of said first and said second replay modes.

7. A digital camera according to claim 1, wherein an image receiving area, which captures an optical image of said object, of said imaging device has an aspect ratio similar to the aspect ratio of said first rectangle.

8. A digital camera according to claim 1, further comprising a signal processor that performs a trimming process for said image signal generated by said imaging device so that a processed image corresponding to the image signal having undergone said trimming process has an aspect ratio similar to the aspect ratio of said first rectangle, said processed image being displayed on said monitor.

9. The digital camera according to claim 1, said monitor defining a quadrilateral, wherein said monitor controller displays said displayed image on said monitor such that two adjacent corners of said displayed image are positioned at two different adjacent corners of said monitor in each of the first and second replay modes.

10. The digital camera according to claim 1, said monitor comprising an image display portion and a single photographic information display portion, an area of said image display portion and an area of said single photographic information display portion equaling a total area of said monitor.

11. An image replay machine, comprising:
an image signal receiver that receives an image signal corresponding to an image in the shape of a first rectangle having a first aspect ratio, said first rectangle having a first long side and a first short side;
a monitor on which an image corresponding to said image signal is displayed, said monitor including a second rectangle having a second aspect ratio, said second aspect ratio being lower than said first aspect ratio if said first aspect ratio is higher than one, said second aspect ratio being higher than said first aspect ratio if said first aspect ratio is lower than one, said second rectangle having a first side and a second side;
a monitor controller that selectively causes a displayed-image corresponding to said image signal received by said image signal receiver to be displayed on said monitor in a first or a second replay mode, said displayed-image being displayed such that said first long side is parallel to said first side and such that an aspect ratio of said displayed-image is the same as said first aspect ratio in the first replay mode, said displayed-image being displayed rotated by 90 degrees such that said first long side is parallel to said second side and such that an aspect ratio of said displayed-image is the same as a reciprocal of said first aspect ratio in the second replay mode,
said monitor controller switching between said first replay mode and said second replay mode based on an inclination-signal, the inclination-signal being generated by a position sensor when the position sensor detects that a digital camera is inclined with respect to a straight line perpendicular to a light receiving surface of an imaging device and parallel to the horizon, the digital camera including the imaging device and the position sensor, the imaging device generating said image signal, the inclination-signal being associated with said image signal, and said image signal being generated concurrently with the inclination-signal,
the digital camera including a photographing mode in which the positions of the image and photographic information on the monitor do not change in accordance with an orientation of the digital camera while the orientation of the photographic information on the monitor changes in accordance with the orientation of the digital camera,
wherein, in the replay modes, the positions of the image and photographic information on the monitor change in accordance with the orientation of the digital camera in the photographing mode, while the orientation of the photographic information on the monitor does not change in accordance with the orientation of the digital camera in the photographing mode.

12. An image replay machine according to claim 11, wherein said image signal receiver receives a photographing signal, corresponding to photographing information, associated with said image signal, said photographing signal and said image signal being concurrently generated, and said monitor controller displays said photographing information on a portion of said monitor that is distinct from a portion of said monitor for displaying said displayed-image in said first and said second replay modes.

13. The image replay machine according to claim 11, wherein said monitor controller displays photographing information on a portion of said monitor that is distinct from a portion of said monitor on which said displayed image is displayed, and said monitor controller changes an orientation of said displayed photographic information based on the inclination signal, in a photographing mode where said image signal generated by the imaging device is stored in a memory of the digital camera when a photographing command is input.

14. The image replay machine according to claim 11, said monitor defining a quadrilateral, wherein said monitor controller displays said displayed image on said monitor such that two adjacent corners of said displayed image are positioned at two different adjacent corners of said monitor in each of the first and second replay modes.

15. The image replay machine according to claim 11, said monitor comprising an image display portion and a single photographic information display portion, an area of said image display portion and an area of said single photographic information display portion equaling a total area of said monitor.

16. A digital camera for photographing an object and obtaining an optical image of the object as an image having the shape of a first rectangle that has a first aspect ratio, said first rectangle having first long sides and first short sides, said digital camera comprising:
an imaging device that generates an image signal corresponding to the optical image of the object;
a memory that stores said image signal generated by said imaging device;
a monitor on which an image corresponding to said image signal is displayed, said monitor having a square shape having first sides and second sides;
a monitor controller that causes a displayed-image corresponding to said image signal stored in said memory to be selectively displayed on said monitor in a first or a second replay mode, said displayed-image being displayed such that one of said first long sides is parallel to one of said first sides and such that an aspect ratio of said displayed-image is the same as said first aspect ratio in said first replay mode, said displayed-image being displayed as being rotated by 90 degrees such that one of said first long sides is parallel to one of said second sides and such that an aspect ratio of said displayed-image is the same as a reciprocal of said first aspect ratio in said second replay mode, and
a position sensor that generates an inclination-signal when said position sensor detects that said digital camera is inclined with respect to a straight line perpendicular to a light receiving surface of said imaging device, and parallel to the horizon,
said memory storing said inclination-signal, generated currently with said image signal in association with said image signal,
said monitor controller switching between said first replay mode and said second replay mode based on said inclination-signal,
said digital camera including a photographing mode in which the positions of the image and photographic information on the monitor do not change in accordance with an orientation of the digital camera while the orientation of the photographic information on the monitor changes in accordance with the orientation of the digital camera, wherein, in the replay modes, the positions of the image and photographic information on the monitor change in accordance with the orientation of the digital camera in the photographing mode, while the orientation of the photographic information on the monitor does not change in accordance with the orientation of the digital camera in the photographing mode.

17. The digital camera according to claim 16, wherein said monitor controller displays photographing information on a portion of said monitor that is distinct from a portion of said monitor on which said displayed image is displayed, and said monitor controller changes an orientation of said displayed photographic information based on said inclination signal, in a photographing mode where said image signal generated by said imaging device is stored in said memory when a photographing command is input.

18. The digital camera according to claim 16, said monitor defining a quadrilateral, wherein said monitor controller displays said displayed image on said monitor such that two adjacent corners of said displayed image are positioned at two different adjacent corners of said monitor in each of the first and second replay modes.

19. The digital camera according to claim 16, said monitor comprising an image display portion and a single photographic information display portion, an area of said image display portion and an area of said single photographic information display portion equaling a total area of said monitor.

* * * * *